(12) United States Patent
Bates

(10) Patent No.: US 7,052,186 B1
(45) Date of Patent: May 30, 2006

(54) SECONDARY LATCH SLEEVE FOR CONNECTOR CONNECTIONS

(75) Inventor: Charles Linsday Bates, Laguna Hills, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/148,030

(22) Filed: Jun. 8, 2005

(51) Int. Cl.
G02B 6/38 (2006.01)
G02B 6/00 (2006.01)
H01R 13/627 (2006.01)

(52) U.S. Cl. .................. 385/59; 385/139; 439/352

(58) Field of Classification Search ............ 385/62, 385/75, 81, 139, 59; 439/352, 357–358
See application file for complete search history.

(56) References Cited

U.S. PATENT DOCUMENTS

| | | | | |
|---|---|---|---|---|
| 5,123,071 A | * | 6/1992 | Mulholland et al. | 385/53 |
| 6,024,498 A | * | 2/2000 | Carlisle et al. | 385/56 |
| 6,290,527 B1 | * | 9/2001 | Takaya et al. | 439/352 |
| 6,325,547 B1 | * | 12/2001 | Cammons et al. | 385/76 |
| 6,364,685 B1 | * | 4/2002 | Manning | 439/357 |
| 6,821,024 B1 | | 11/2004 | Bates, III | |
| 6,908,233 B1 | * | 6/2005 | Nakajima et al. | 385/53 |
| 2003/0091295 A1 | * | 5/2003 | Cheng | 385/76 |

* cited by examiner

*Primary Examiner*—Michelle Connelly-Cushwa
*Assistant Examiner*—Chris Chu
(74) *Attorney, Agent, or Firm*—Peter Van Winkle

(57) ABSTRACT

A plurality of connectors (12, 14) of the type that has a primary latch with a handle (50) that can be depressed so the connector can be pulled out of a receiver passage (20, 22), and a secondary latch with a sleeve (60, 62) that can be slid forward to wedge a part under the handle so it cannot be depressed. The same slidable sleeve is used to normally connect a pair of connectors, while allowing a connector-to-be-serviced of the pair to be disconnected from the other one while said other one continues to lie in a receiver passage and carry signals. The sleeves are identical and each has a tongue and groove (74, 76) at its opposite sides, and also has engaged detents at its opposite sides. The groove is open at its front and rear ends.

8 Claims, 3 Drawing Sheets

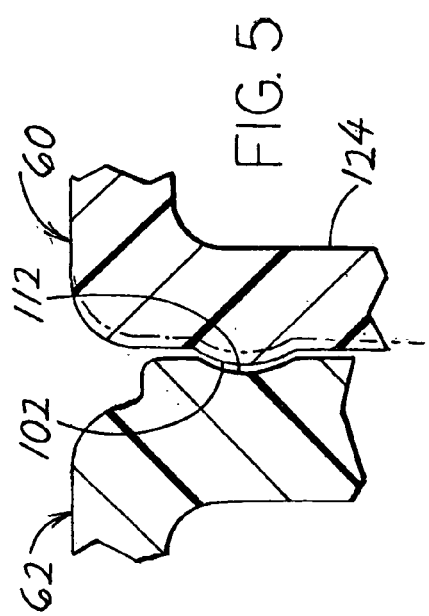
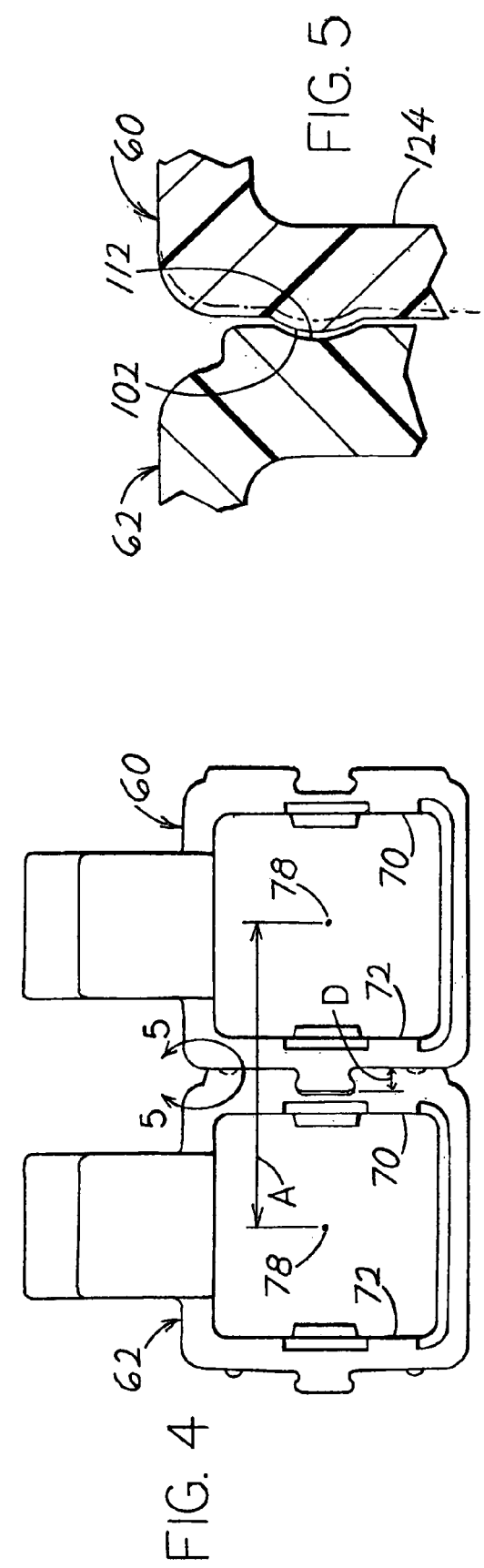
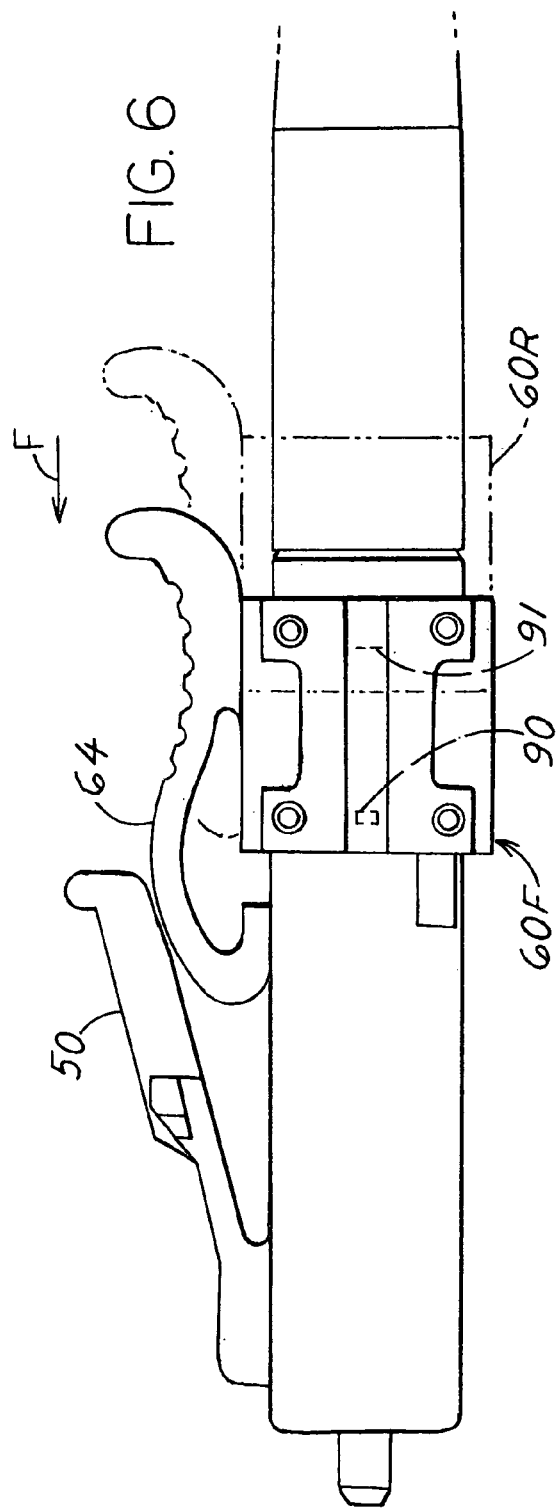

even when viewing pages is interrupted, from time to time it may be necessary to pause and reflect.

SECONDARY LATCH SLEEVE FOR CONNECTOR CONNECTIONS

BACKGROUND OF THE INVENTION

My earlier U.S. Pat. No. 6,821,024 describes a miniature connector of the type that has a housing with a body that fits into a receiver passage, and a latch on the body that has a latch handle. An RJ-45 type latch of the fully inserted connector, has shoulders that engage receiver shoulders to prevent connector pullout, until the latch handle is depressed to move the latch shoulders under the receiver shoulders. My earlier patent describes a secondary latch that can be slid forward to lie under the latch handle and prevent its accidental opening, and that can be slid rearward so the latch handle can be depressed.

The above type of miniature connector, especially when it is used to couple two optical fibers, is commonly used in pairs. One connector of the pair is used to receive signals from a source and the other connector is used to send signals to the source. Many connectors may be present in a connector complex. Sometimes the wrong two connectors are paired and only after other sources of errors are checked out is the mismatching of connectors discovered. Other applications required more than two connectors to be used as a group.

It would be desirable if pairs (or more than two) of connectors could be held together indefinitely, but could be separated once in a while when one of the connectors had to be serviced as to clean the tip of its fiber and ferrule, or to replace a damaged part. Also, it would be desirable if the one connector of a pair that did not have to be serviced, could continue to carry signals without interruption while the other connector was removed and serviced. Such holding together should be provided at little if any additional cost for the connector described in the above patent that has a sliding secondary latch, and with the holding together provided without interference by the sliding secondary latch.

SUMMARY OF THE INVENTION

In accordance with one embodiment of the invention, connectors are provided of a type that are each slidable into a receiver passage and that each has a secondary latch sleeve that is slidable in forward and rearward directions on a connector body to hold down or releases a latch handle. Two (or more) connectors are held so they normally stay together, but so the connectors can be separated by application of a large force, all in a connector system of low cost and easy operation.

Each sleeve has laterally opposite sides forming couplings to connect one connector to another connector. One side of a first sleeve has a tongue, and an adjacent side of a second sleeve has a groove that receives the tongue to connect the two connectors. The adjacent sides of the two sleeves have detents, including recesses and projections that fit into the recesses, to latch the sleeves together so they do not separate unless a large force is applied.

Initially a pair of connectors each lies in a separate passage of the receiver, as where one connector receives signals from a source and the other one transmits signals to that source. A second of the pair of connectors can be removed from the receiver and from the other connector, as to repair or maintain the removed connector. This is accomplished by forcing the sleeve of the second connector rearwardly so the second sleeve releases the latch handle of the second connector, and simultaneously disconnects the sleeve of the second connector from the sleeve of the first connector. The disconnectable connection of a pair of connectors is accomplished by using a sleeve similar to a prior sleeve that holds a secondary latch, with only modifications to the sleeves.

The novel features of the invention are set forth with particularity in the appended claims. The invention will be best understood from the following description when read in conjunction with the accompanying drawings.

BRIEF DESCRIPTION OF THE DRAWINGS

FIG. 4 is a front elevation view of a pair of connected sleeves, without the connectors.

FIG. 5 is enlarged sectional view of area 5—5 of FIG. 4.

FIG. 6 is a side elevation view of one of the connectors of FIG. 1, with the secondary sleeve in its latched position.

DESCRIPTION OF THE PREFERRED EMBODIMENTS

Figure 1:
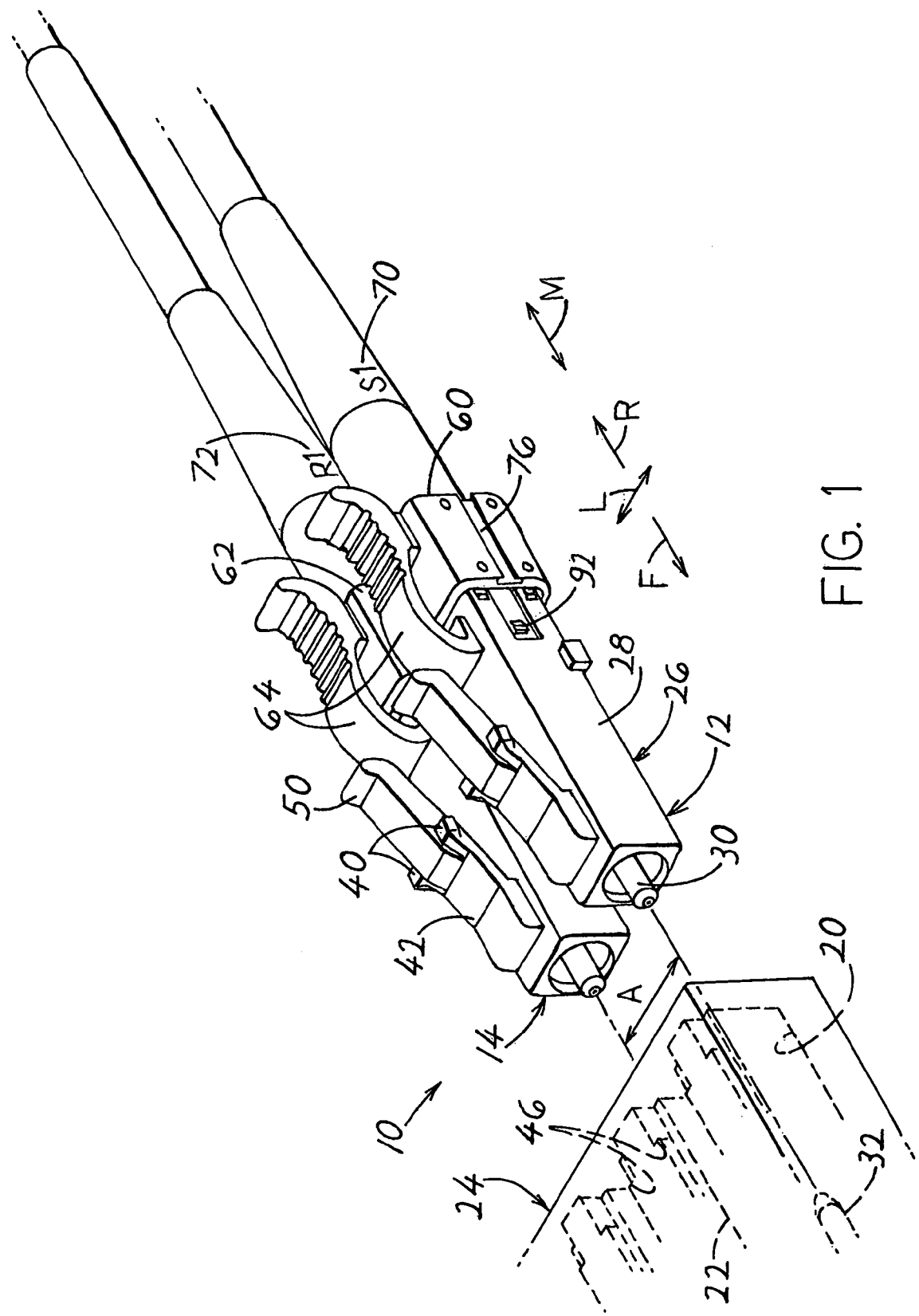
FIG. 1 is an exploded isometric view of a connector system of the invention, showing two coupled connectors approaching a receiver.

FIG. 1 shows an optical communication system 10 of the invention which includes two miniature optic fiber connectors 12, 14 that are each insertable into a corresponding passage 20, 22 of a receiver 24. Each connector includes a housing 26 with a body 28 that holds a ferrule 30. The ferrule 30 holds the tip of an optic fiber. When the ferrule is fully inserted into a receiver passage (and into an alignment sleeve, not shown), the ferrule tip abuts the tip of a mating ferrule 32. When such full insertion occurs, a pair of connector latch shoulders 40 of a connector latch 42 that merges with the connector body 28, lie behind a pair of receiver shoulders 46 to hold the connector in the receiver. A connector can be removed by depressing a latch handle 50 of the connector latch to lower the latch shoulders so they are out of line with the receiver shoulders so the connector can be removed.

My earlier U.S. Pat. No. 6,821,024 describes a sleeve corresponding to sleeves 60, 62 for each connector, that carries a secondary latch 64. Each sleeve can be slid from its rearward position 60R (FIG. 6), forwardly F to the forward position 60F shown in FIG. 6, wherein the secondary latch 64 wedges under the latch handle 50 to prevent accidental handle depression and pullout of the connector from the receiver. A technician moves the sleeve to its forward position after inserting the connector into a receiver passage. Before removing the connector from a receiver passage, the technician first pulls the sleeve to its rearward position and then depresses the latch handle 50 and pulls out the connector. Applicant notes that when the sleeve is slid to its rearward position at 60R, the tongue and groove are still engaged. A stop 91 on the body engages a lug 90 on the sleeve to limit rearward sleeve movement.

Certain groups of connectors are usually used together, by inserting them into two adjacent passages of the receiver. In FIG. 1 a first connector 12 carries a marking 70 "S1" that indicates that this connector (and its optic fiber) are to be used to send signals to a particular source no. 1. A second connector 14 carries a marking 72 "R1" that indicates that this connector is to be used to receive signals from source no. 1. The receiver typically carries corresponding markings. Where there are a large number of connectors present, it is often time consuming to find two matching connectors and plug them into the proper receiver passages. Mistakes are sometimes made by plugging the wrong connector into a passage, and it is time consuming to correct such mistake.

Figure 3:
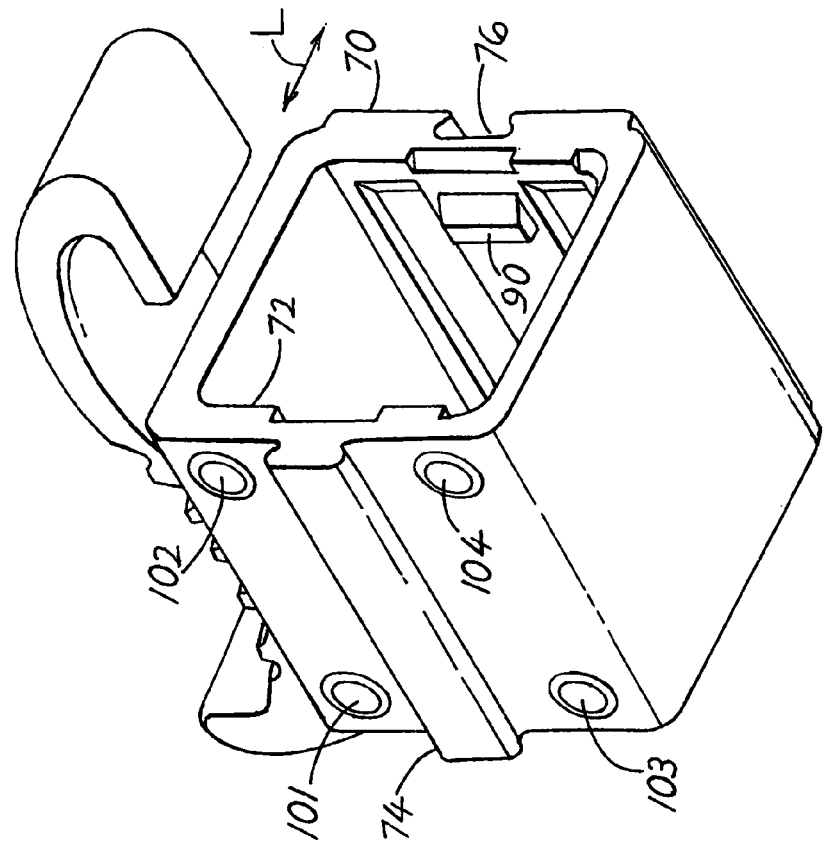
FIG. 3 is a front, bottom and right side isometric view of the sleeve of FIG. 2.
Figure 2:
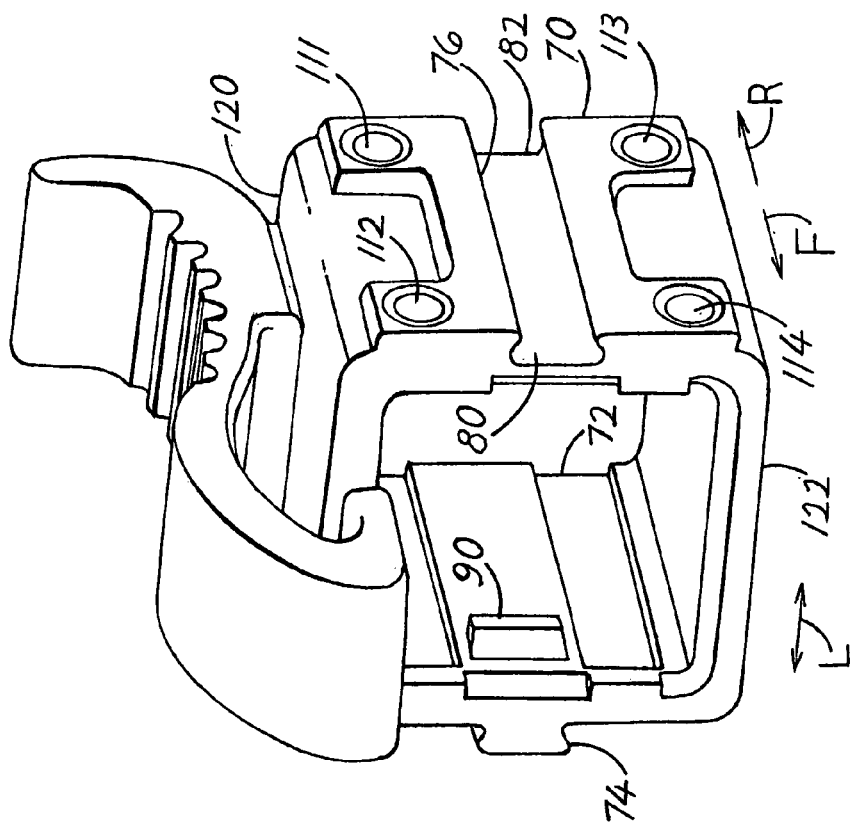
FIG. 2 is a front, top and left side isometric view of one sleeve of the system of FIG. 1.

In accordance with the present invention, applicant joins two connectors that are normally used together and that are normally plugged into adjacent passages, so the pair of connectors can be handled as a unit. Applicant joins the two connectors of a pair by couplings formed by the same sleeves 60, 62 that form the secondary latches. As shown in FIGS. 2 and 3, each sleeve has laterally L opposite side walls 70, 72 that are modified to form couplings that connect two sleeves together. One side wall 72 forms a tongue 74 and the other side wall 70 forms a groove 76 that receives the tongue of the other sleeve. In addition, the side walls are made sightly thicker so when the tongue and groove fit together, the centers of the connectors are laterally L spaced by the same distance as the spacing for the receiver passages. The receiver passages are spaced at a pitch (center-to-center) distance A (FIG. 4) of 0.2 inch and the side walls 70, 72 are constructed so when two sleeves are joined the axes 78 of the connectors are at the same pitch A. Since the passages of the prior receiver are closely spaced, only a small additional increase in wall thickness is required. Such increase in average wall thickness is taken up by the lateral thickness D of the tongue interfitting in the groove.

The groove 76 (FIGS. 2 and 3) has open front and rear ends 80, 82. This allows a connector to be pulled out by the tongue moving rearward out of the groove, or by a groove moving rearward of a tongue. Thus, either connector can be pulled out of a receiver passage and simultaneously out of engagement with another connector that remains in a receiver passage.

Each sleeve has latch lugs 90 that requires a low forward force (e.g. 6 ounces for a connector body of 0.170 inch width) on the sleeve to move the sleeve forward past a latch lug 92 (FIG. 1) on the body to wedge the secondary latch under the latch handle. A somewhat higher rearward force (e.g. 12 ounces) must be applied to the sleeve to move the latch lug rearward so the latch handle then can be depressed. Applicant constructs the sleeves so it requires an even greater force (e.g. 2.5 pounds) to slide one sleeve longitudinally M forward or rearward out of engagement with another sleeve. Such retaining force is provided by projection detents 101–104 (FIG. 3) on one side of the sleeve and recess detents 111–114 (FIG. 2) on the adjacent side of the other connector.

FIGS. 2 and 3 show that one side of each connector has four detent projections 101–104 and the other side has four detent recesses 111–114, all located near the tops 120 and bottoms 122 of the sleeves. As shown in FIG. 5, the projections such as 102 snap into the recesses such as 112 by slight bending of the side walls 124. The top and bottom detent projections are each closer to a sleeve top 120 or bottom 122 than to the sleeve middle, to provide more wall length for such bending. The tongues and grooves lie halfway between the top and bottom of the sleeve.

The two coupling sleeves 60, 62 are identical. This not only reduces the number of different parts that must be stocked, but also allows more than two connectors to be connected together and allows any one of them to be detached and pulled out of a receiver without disturbing the other connectors.

Although terms such as "top" and "bottom" have been used to describe the invention as it is illustrated, it should be understood that the invention can be used in any orientation.

Thus, the invention provides a means for side-by-side coupling of two (or more) connectors so they remain side-by-side during normal usage when they are plugged into receiver passages, unplugged from the receiver and lie around unused, or are cleaned and checked. However, the means for coupling the connectors allows one of the connectors of the pair to be pulled out of a receiver passage, while the other connector of the pair remains in the receiver and continues to receive and/or transmit signals. The coupling means can be formed by sleeves that are each mounted on one of the connectors of a pair. The sleeves are connected to each other, as by a tongue and groove connection with detents that resist relative sliding but allow it when a large forward or rearward force (e.g. over one pound for a miniature connector) is applied. Sleeves for coupling two connectors can be provided without taking up substantial extra space and at minimum additional cost, by modifying the sleeves of secondary latches that may already be provided for each connector. The secondary latches have sleeves that slide on the connector bodies. Such secondary latch sleeves are modified by forming couplings such as of the tongue and groove type and with detents, and forming such tongue-and-groove or other coupling to add additional width so the connected pair of connectors are laterally spaced apart (center-to-center) by the same standard pitch of two adjacent receiver passages. All sleeves are preferably identical (in their functioning).

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A connector system that includes a plurality of connectors for forward insertion into laterally spaced passages of a receiver wherein said passages are spaced at a predetermined passage pitch, wherein each connector includes a housing with a body, said housings each including a primary latch with a front end merging with a front portion of said body and with a latch middle forming a pair of largely rearwardly-facing latch shoulders and with a latch rear end forming a latch handle that can be resiliently depressed to move down said latch shoulders to positions out of line with a pair of largely forwardly-facing receiver shoulders of said receiver, wherein each connector includes a sleeve slideably mounted on the body of the connector to slide longitudinally between forward and rearward positions, with each sleeve forming a wedge part that lies against a lower surface of the corresponding latch handle in the sleeve forward position but not in the sleeve rearward position, wherein:

said sleeves include couplings that hold at least a pair of connectors together at a pitch equal to said passage pitch so said pair of connectors can be inserted simultaneously into a pair of said passages and simultaneously removed from the pair of passages and so the pair of connectors remain together before and after insertion and removal;

said couplings being slideable in forward and rearward directions relative to each other and relative to said connector housings, to couple and uncouple said connectors from each other to allow one of said pair of connectors to be detached from the other by applying a large rearward force to one coupling to slide it rearward out of engagement with the other, whereby when said pair of connectors both lie in said receiver one of said connectors can be removed by sliding its sleeve rearward and then depressing its latch handle.

2. The system described in claim 1 wherein:

each of said sleeves has laterally opposite first and second sides, a first side of one sleeve having a laterally projecting tongue and a second side of a second sleeve forming an undercut groove that receives the tongue by sliding of the tongue both forwardly and rearwardly into the groove, said sleeves joined by said tongue lying in said groove;

one of said sides of one of said sleeves having at least one detent projection and an adjacent side of the other sleeve having at least one detent recess that receives said detent projection and resists longitudinal sliding of the detent out of the recess unless a large longitudinal force is applied, said tongue, groove and detent projection and recess forming said couplings.

3. The system described in claim 2 wherein each of said sleeves has top and bottom walls, and wherein:

said at least one detent projection and detent recess includes at least two of each;

said tongue and groove each lie about halfway between the top and bottom walls of the corresponding sleeve, and said detent projections and detent recesses each lie closer to the top and bottom walls of the corresponding sleeve than to said tongue or groove of the sleeve.

4. The connectors described in claim 1 wherein:

said sleeves are identical, each having first and second laterally opposite sides, the first side having a laterally projecting tongue and the second side having a groove that receives a tongue, each groove extending longitudinally and having open front and rear ends;

one side of each of said sleeves has a detent projection and the opposite side of the sleeve has a detent recess that receives a detent projection to temporarily fix the relative longitudinal positions of the sleeves, said tongues, grooves and detent projection and recess forming said couplings.

5. A system that includes a receiver having a plurality of passages, and a plurality of connectors that each has a housing with a body having a front portion that is insertable in a forward longitudinal direction into one of said passages, comprising:

first and second sleeves each surrounding one of said housing bodies and slideable in forward and rearward longitudinal directions on a corresponding body, said bodies and sleeves each having detent means that tend to retain the sleeve at each of two longitudinally spaced positions on its body, said first sleeve having laterally opposite sides and having an undercut tongue projection projecting from a first side of the first sleeve, and said second sleeve having laterally opposite sides and having an undercut groove extending along a second side of the second sleeve;

said first and second sides of said sleeves lying adjacent to each other and being connected together with said tongue projection lying in said groove;

each of said adjacent sides of said sleeve having detents that engage each other to prevent one of said sleeves from moving longitudinally relative to the other unless a large disengagement force is applied that urges one sleeve longitudinally with respect to the other sleeve.

6. The system described in claim 5 wherein each connector housing includes a latch forming latch shoulders that engage receiver shoulders of said receiver, and a latch handle that is depressable to disengage the latch shoulders from the receiver shoulders, and each of said sleeves is slideable to a forward position wedged under a corresponding handle to prevent handle depression and to a rearward position wherein the handle is released to be depressed, wherein:

said groove is open both forwardly and rearwardly, so either connector can be unlatched from said receiver shoulders and from the other connector by pulling its sleeve rearward and then depressing its latch handle.

7. The system described in claim 5 wherein:

said first and second sleeves are identical with each sleeve having one of said tongues at one side and one of said grooves at its laterally opposite side, with each of said sides having detents positioned to latch to a detent at the opposite side.

8. The system described in claim 6 wherein:

when one sleeve of a pair is slid to said rearward position but the other sleeve of the pair is in its forward position, and both connectors are fully installed in adjacent receiver passages, the tongue of one sleeve remains in the groove of the other sleeve.

* * * * *